Feb. 27, 1923.

B. MACPHERSON

ELECTRICAL CONDENSER

Filed Oct. 22, 1919

INVENTOR
Byron Macpherson
BY
Philip Farnsworth
ATTORNEY

Patented Feb. 27, 1923.

1,446,650

UNITED STATES PATENT OFFICE.

BYRON MACPHERSON, OF ROXBURY, MASSACHUSETTS, ASSIGNOR TO WIRELESS SPECIALTY APPARATUS COMPANY, OF BOSTON, MASSACHUSETTS, A CORPORATION OF NEW YORK.

ELECTRICAL CONDENSER.

Application filed October 22, 1919. Serial No. 332,479.

*To all whom it may concern:*

Be it known that I, BYRON MACPHERSON, a citizen of the United States, and a resident of Roxbury, Massachusetts, have invented certain new and useful Improvements in Electrical Condensers, the principles of which are set forth in the following specification and accompanying drawings, which disclose the form of the invention which I now consider to be the best of the various forms in which the principles of the invention may be embodied.

This invention relates to improvements in electrical condensers of the plate or sheet type, especially of the type wherein the condenser is divided into sections and the sections connected in series for high potential service altho not limited to series condensers, and the invention consists of certain improvements in the means for clamping the stack. This application is a continuation in part of my application Serial No. 301,498 filed June 3, 1919.

Condensers as above mentioned are formed by placing a dielectric between two conductors. The conductors may be electrically separate to permit of the combination functioning as a condenser. If a potential difference is applied across the two conductors electrical energy is stored in the dielectric. In practice condensers are constructed of a combination of dielectrics and conductors. These are arranged in a design that is based on factors which include the natures of the associated dielectrics and conductors, the electric requirements of the condenser, and the space and cost considerations.

Mica is the most desirable solid dielectric for use in a condenser as it possesses certain useful properties such as a high dielectric constant and dielectric strength, mechanical property of being easily split into thin films of approximately constant thickness, and then being easily cut to the required size, its chemically inert nature, low dielectric hysterises, high specific resistance and low reaction to small temperature changes.

Full use of these properties is conditional on the degree of intimate contact between the mica and its associated conductors. Since mica is expensive and space factor is generally important, films whose thickness depends on the potential difference to which the condenser is to be subjected are used. The films are made as thin as possible in keeping with the conditions of the electrical use of the condenser. The mica is, therefore, operated at the highest safe potential difference per mill thickness of mica. Since the dielectric strength per mill of a solid dielectric increases with decreasing thickness of the dielectric, the use of series condensers is more economical than a condenser of thick dielectric built as a single section because higher operating potential differences per mill thickness of mica can be obtained, utilizing a less amount of dielectric per unit of energy carried by the condenser.

If the mica and conductors are not in intimate contact, that is to say if a second dielectric in addition to the mica is present between the conductors serious losses which may even extend to breakdown occur. This is evident from the following considerations. The second dielectric will usually be a material of much lower dielectric strength and dielectric constant than mica. It may be a partial vacuum or a gas, or it may be a liquid or it may be a solid. For example a loosely built stack erected in air contains films and bubbles of air between the micas and the conductors. Both the dielectric constant and the dielectric strength of air are much lower than mica. If the condenser is subjected to a potential difference at its terminals that would have been safe were the micas and conductors in intimate contact, this potential difference is no longer safe now that the air is also present. In spite of the apparent increase of insulation between the conductors, the condenser now brushes across the thin film of air. This is due to the electrical relation that the potential difference per unit distance across two series insulators divides in the inverse ratio of their dielectric constants. For example, if in a three and one half mill space between two conductors subjected to a potential difference we had 3.0 mills of mica and 0.5 mills of air, with mica of a dielectric constant 6 and air of dielectric constant unity, the potential difference across the air per mill would be six times the potential difference across the mica per mill, or in the given case the potential difference across the air would be one half of the total applied potential difference. If the applied potential difference were 2000 volts the 3.0 mills of mica would be subject to 1000 volts and the 0.5 mills of air to 1000 volts. Break down of the air would occur as evidenced by brushing. If the potential difference were applied for a great enough period, the heat developed by this brushing would cause complete break down of the condenser. However, if the mica were in intimate contact with the conductors break down would not occur since the dielectric strength of mica is considerably greater than 666⅔ volts per mill.

The same phenomena to a lesser degree would take place in an oil parasite dielectric where the main dielectric is mica. Another factor played by the parasitical dielectric comes into play when the condenser is used dynamically or with alternating current. Mica has a low dielectric loss. Materials such as bakelite and condensite and binding varnishes have a high dielectric loss. Should these materials be used as binders in building up a stack and should they remain between the conductors, failure may occur when the condenser is operated dynamically. This is due to a combination of causes, namely, high strain across the parasitical dielectric and resultant abnormal loss in this material due to both the above mentioned high strain and high dielectric loss of the material. The heat developed may cause complete breakdown of the condenser.

By my present invention I have provided a clamp which can be adjusted to the correct pressure before placing it in a container or casing and surrounding it with an insulating seal such as wax or oil. Thus when the stack is placed in the casing and surrounded with wax or other filler and the cover placed in position it will be ready for operation and the pressure on the stack is maintained independently of the casing and cover which can be therefore of any suitable material of required electrical strength chosen independently of its mechanical strength. By my construction it is possible to inspect the stack with the final pressure applied and correct it for the alinement of the section conductors, the insulators between the sections and the section terminals before placing in the casing.

It will be seen that the variations in the volume of the seal within the casing due to expansion or contraction due to temperature changes of the mass does not effect the pressure exerted by the clamp which is independent of the cover. The relatively large expansion coefficient of oils and waxes that may be used for fillers, over the expansion coefficient of the case causes an internal pressure on the entire case and cover when the temperature of the mass is raised and, if the case is rigid, the cover must yield and the losses increase rapidly.

My invention is especially applicable to the type of stack in which the two ends are at a difference of potential and is embodied preferably as an insulating clamp, that is a clamp in which the two ends of the stack are connected by a member comprising insulating material. An advantage of my form of clamp resides in the fact that the capacity of the condenser remains constant with time and use.

This clamp in particular comprises metallic end blocks or members engaging the ends of the stack and a flexible band of insulating material connecting the members and drawing the same into clamping relation against the ends of the stack, the ends of the stack being at high potential differences.

Obviously it is possible to place the unit in any desirable casing constructed of any desirable materials. These materials would then be only strong enough mechanically to resist physical damage to the case in handling and do not require mechanical design strong enough to take care of the condenser pressure.

An object of this invention is to provide a clamp which will maintain the insulators or dielectric and conductors as above mentioned in intimate contact.

Another object of this invention is to provide a clamp comprising insulating material for condensers comprising foil sheets and insulators of fragile flexible material, efficiently maintaining them in intimate contact as a unitary structure and properly insulated.

The invention consists further in details of construction and combination of parts hereinafter more particularly described and claimed.

In the accompanying drawings which form a part of this specification Fig. 1 is a side elevation with parts in section illustrating what I now consider to be the preferred form of the invention.

Figure 1:
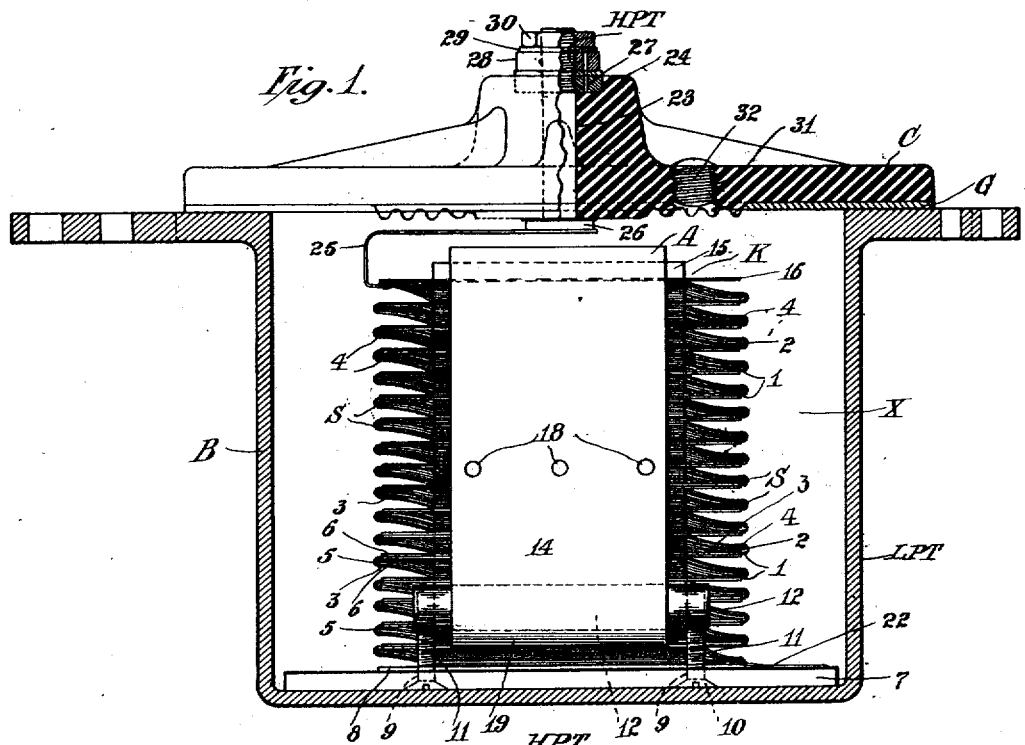
Figure 2:
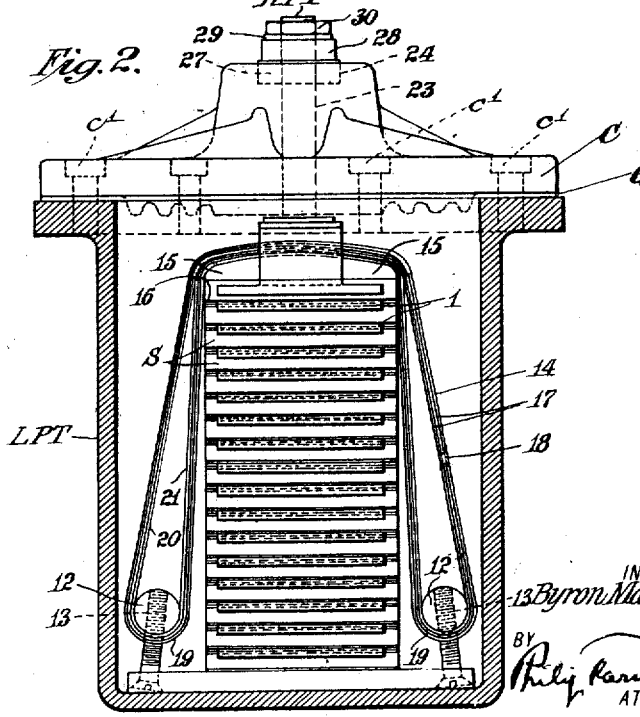
Fig. 2 is an end elevation with parts in section of the structure of Fig. 1.

Referring to Figs. 1 and 2 the space X shown around the stack K and its clamp A in the sealing filler or wax protector or casing B is intended to illustrate the wax or other filler casing or coating around the stack for the purpose of preventing brush discharges and excluding moisture and air, and also preferably around the clamp. This is preferably a mass of wax cast in protector B as a mold and filling the space X and surrounding clamp A and it may be no more than a thin or surface coat providing that it excludes moisture and air from the interior of the stack and assists in preventing brush discharges.

In the type of condenser on which this invention is an improvement, the condenser consists of a stack of plates or sheets, this stack being adapted for high potential service by being divided into sections which are electrically connected together in series by various means in accordance with the established practice for many years, and in which any desired manner of connecting these sections in series may be adopted, but for purposes of illustration I apply the arrangement as shown in Figs. 1 and 2.

The sheets as usual consist of successively located conductors and insulators. In the present condenser such insulating and conducting sheets may be of any desired material but I use metal foil (as lead) for the conducting sheets and mica for the insulating sheets and my condenser is therefore known to the trade as a mica condenser, or specifically, a high potential mica condenser or as a transmitting condenser for use in radio communication.

A desirable feature of construction of this kind is a small volume of the apparatus, but the high potential developed makes this a different problem. The same is true in respect to exposing a minimum of the conducting parts which are at high potential. Other problems have arisen in connection with the importance of the construction whereby the condenser stack is most desirably held under compression and kept permanently dry and free from air inside of the stack and whereby brush discharges are prevented.

I have illustrated clamp A Figs. 1 and 2 applied to a series of sections S constituting the stack K and connected together by connectors 1 of sheet copper. Each connector at one end 2 is bent around the foil bunch 3 at one end of a section S and soldered at 4 to the outer or remote side of the foil bunch 3. The connector 1 then extends between adjacent sections parallel thereto and is bent at its opposite end 5 around the foil bunch 3 at the opposite end of an adjacent section S and soldered to the outer or remote side thereof as indicated at 4. The inner portions of the connectors 1 are unattached to the foil bunches. Separators 6 are interposed between said adjacent sections S and upon opposite sides of the connectors 1 for insulating purposes.

This stack construction is more fully illustrated described and claimed in the above mentioned co-pending application Serial Number 301,498 and is illustrated here merely to show an application of the present invention.

The stack K is mounted upon a metal clamping or base plate 7 which is also defined as a pressure member. Interposed between the clamping plate 7 and the stack K is an insulating sheet 8.

Upon opposite sides of the stack are pairs of openings 9 in the clamping plate, the lower portion of these openings being conical to receive the head 10 of screws 11. Clamping bars or rods 12 provided with threaded openings 13 adjacent to their ends receive the threaded portions of the screws 11. These clamping bars are arranged parallel to each other upon opposite sides of the stack. Insulating means is preferably provided for connecting the two ends of the stack which are generally at high potential differences. Preferably a band or loop 14 is therefore attached at one end to one clamping rod 12, extends over the opposite end of the stack and over a brass convex pressure member or block 15 on said end and is attached at its other end to the other clamping rod 12. The pressure block 15 is insulated from the stack by a sheet of fiber 16 and prevents the loop 14 from damaging the mica and foils constituting the stack. Furthermore the clamping rods 12 are spaced from the stack sufficiently to keep the band 14 out of contact with the sides of the stack. The band 14 preferably consists of a strip of flexible insulating material of high tensile strength and practically nonstretchable. The band is formed by looping the strip and securing the several plies 17 by means of eyelets 18. The closed ends 19 extend around or below the clamping bars 12 forming a dependable means of securing the band thereto. This arrangement provides a doubled intermediate portion extending from one clamping rod over the top or around the opposite end of the stack and pressure member 15 to the other clamping rod and comprising the parts 20 and 21, each having several plies 17.

When band 14 is in place around the clamping rods 12 and the end of the stack, the screws 11 are adjusted drawing the base plate or lower pressure member and the upper pressure member towards each other whereby the pressure exerted by clamp A upon the ends of the stack is adjusted to the proper amount. The adjusting screws 11 are located at opposite sides of the stack and the adjusting force is applied at both sides of loop 14 whereby the pressure is transmitted evenly to the ends of the stack without danger of tilting or dislocating the elements thereof.

The clamp A maintains pressure upon the insulating stack at all times whereby the insulating sheets and conductors of each section and the several sections are maintained in intimate contact.

In assembling the stack is preheated and the screws 11 are tightened while the stack is under pressure. All this will be done before placing the unit in the casing and securing it thereto thus allowing inspection of the stack before being surrounded by wax or other filler.

The band is preferably composed of fish paper altho canvas or other fiberous insulating material may be used. The material composing the band is capable of standing up under hot wax and does not increase in length appreciably under tension. The construction herein described can be easily assembled and provides a high degree of efficiency at a minimum cost.

An important feature of the above construction resides in the location of the drawing bars or clamping rods 12 well outside of the voltage gradient line and as the fiber is a fine non-conductor this is an ideal method of construction in every way.

Of course, the stack K of this condenser, like any condenser stack of sheets requires initial treatment during manufacture for the purpose of removing internal air and moisture, and consolidating the stack of sheets before being covered with the coating of wax which thereafter is to keep out the air and moisture. Any of the various well known methods may be used for this treatment which usually include immersion in molten wax, in or out of vacuo, and a compression or variation of the compression of the stack. For the latter purpose a clamp is used during the process but in this instance the clamp A, that is the stack K and its clamp A may act as a unit during the treatment. The stack and clamp in the present case are assumed to have been properly treated as above and in proper condition of clamping pressure and are ready to be inserted in casing B and surrounded by wax X or other filler.

The wax protector B is so called because it may serve initially as a mold for the wax casing X when the latter fills container B yet thereafter B remains as a permanent part of the assembly for the purpose of protecting the wax filler which it does whether the filler be merely a coating around the stack or a thick mass filling protector B.

In preparation for the casting of the wax in receptacle B the stack K and clamp A in place around it are inserted in protector B as the mold and protector. If desired indeed the receptacle B may be used previously for the above treatment of the stack, i. e., all three parts, stack K clamp A and receptacle B may be used together in the preliminary treatment of the stack.

The wax is then cast in the mold B around the stack and clamp, the latter being supported by and secured to the casing thru the base plate 7 which is secured to the casing in any suitable manner independently of the wax during cooling and after it has solidified.

Before the wax is applied one end of the lowest section S is connected by lead 22 to the casing B. The lead 22 is preferably soldered to the clamping plate 7 the casing B constituting the low potential terminal L P T. The stack K is enclosed by the casing B provided with an insulating cover C having an opening 23 with an upper recess 24. A terminal stud therethru constitutes the high potential terminal H P T. A lead 25 connects one end of the top section S thereto as more fully described hereinafter. The expressions "high potential terminal" and "low potential terminal" are of course only relative terms and the actual high potential and low potential depends entirely on the condition of the circuit in which the condenser may be used.

At the time when the stack and clamp are cast in wax B the high potential lead 25 is left projecting above the wax in preparation for the application of the condenser cover.

After the wax if used in B has been cooled and solidified the top or cover may be applied upon gasket G interposed for water-tightness. Before the cover is applied the high potential lead 25 left projecting above the wax is connected up thru gasket G and with terminal H P T. The means for making such connection are designed to obviate the necessity of a long lead. The terminal stud H P T extends thru opening 23 in the cover, is provided with a head 26 at its lower end to which the lead 25 is soldered and is threaded at its upper end. A brass knurled insert 27 surrounds the upper portion of the stud and fits in the recess 24 on the top of the cover. A threaded lock washer 28 is now placed on the threaded stud drawing the head 26 up against the bottom of the cover. A washer 29 is placed above this and a nut 30 is provided for clamping any desired connection to terminal H P T. The cover is now placed in position and secured to the casing by suitable fastening devices such as screws C'. After the cover is secured in position the space between the cover and wax or other filler already in the case is filled with wax or other filler thru a suitable opening 31 in the cover which is then closed with a fiber screw or plug 32 making the casing air tight and protecting lead 25.

The particular condenser here shown has a capacity of 0.004 micro-farad in extensive use for transmitters and radio communication. In the example disclosed each section S may consist of the size, number and thickness of sheets which will give it a capacity as above mentioned.

The wax protector or casing B may be of any desired material or shape because it has no necessary mechanical or electrical co-operation with the condenser stack and the specific embodiment of clamp herein disclosed. Thus it may consists of any simple wood or fiber box of any size, or shape if desired. In fact as the stack K and clamp A constitute a complete operative condenser they may be used without any covering over the casting or coating of wax, but, of course, it is extremely advantageous to provide a wax protector and to also have it of metal as the most practical form of protector during use of the condenser.

I prefer that the casing B be of metal such as aluminum molded thin to shape as a single and economic construction. Aluminum is light, relatively cheap and easily molded but any other material may be used such as a tin or sheet brass casing.

The walls of the container B are substantially vertical and arranged close to the lower portions of the clamp. The band 14 being of fibrous insulating material of substantial width, insulates, in addition to the wax, or other filler the adjacent portions of the stack from the adjacent walls of the casing, preventing brushing.

In the construction herein disclosed the clamping means is entirely distinct from the cover and independent thereof; the latter playing no part in compressing the stack. The cover may consist of any suitable insulating material such as electrose, or the like, molded as shown.

Figure 3:
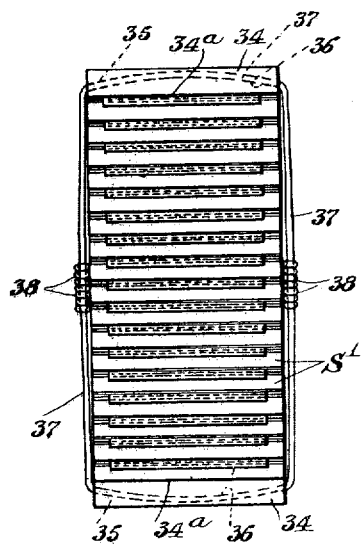
Fig. 3 is an end elevation of a modified form of the invention, the casing being omitted.
Figure 4:
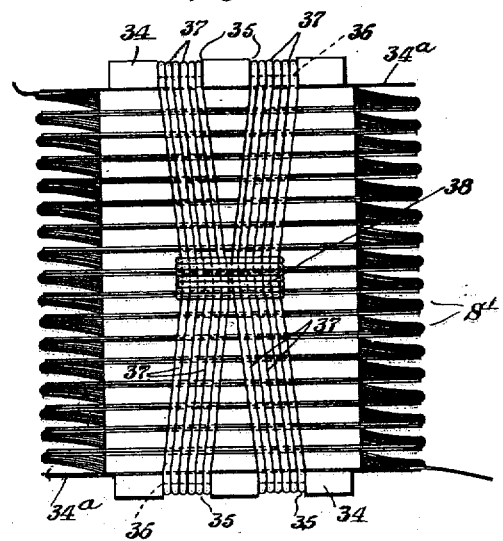
Fig. 4 is a side elevation of the structure shown in Fig. 3.

Referring to Figs. 3 and 4 I have illustrated another form of the invention which may be used either with or without a casing as above described. In the construction shown in Figs. 3 and 4 the sections S' are arranged in superimposed position and connected in series in any suitable way altho I have illustrated them connected as in Figs. 1 and 2.

At the opposite ends of the stack are placed metal blocks or pressure members 34 each separated from its end of the stack by means of a fibrous sheet 34ª. The outer portion of each block is provided with a pair of transversely extending spaced grooves 35 having convex bottoms 36 as shown in Fig. 3. Extending around the stack and blocks are strong flexible fiber bands 37 of any suitable material, preferably cord, having good insulating qualities. The portions of the bands extending over the blocks are located in the grooves 35 which prevent displacement of the bands and hold them in position. The pressure blocks provide a firm abutment for the bands and prevent them from damaging the elements of the stack which are built up as described in connection with Figs. 1 and 2. Upon opposite sides of the stack the bands 37 which are spaced are connected and drawn together by means of transverse toggle fastenings 38 of like material. These fastenings 38 draw the lateral portions of the bands inwardly toward each other thereby drawing the blocks 34 toward each other clamping the blocks against the ends of the stack and providing intimate contact of the elements thereof. The fastenings 38 are at opposite sides of the stack and the pressure exerted on the blocks or pressure members is uniformly distributed over the ends of the stack when the bands are drawn up thereby preventing tilting or distortion of the stack.

The opposite ends of the stack are preferably at different potentials and the construction of Figs. 3 and 4 provides a clamp which properly insulates the ends of the stack from each other and at the same time clamps the elements thereof into intimate contact, maintaining the condenser at a constant capacity.

The stack and clamp may be placed in a casing and treated as above described.

The condenser as above described and illustrated in Figs. 3 and 4 has been tested and found successful for transmitting condensers operating at 21,000 volts and carrying 18 amperes.

Figure 5:
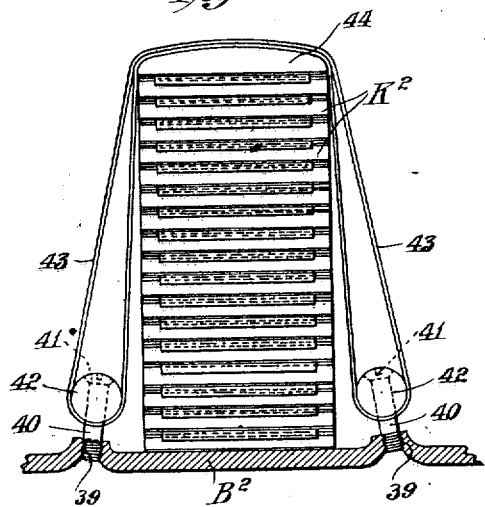
Fig. 5 is an end elevation with parts broken away of another form of the invention.
Figure 6:
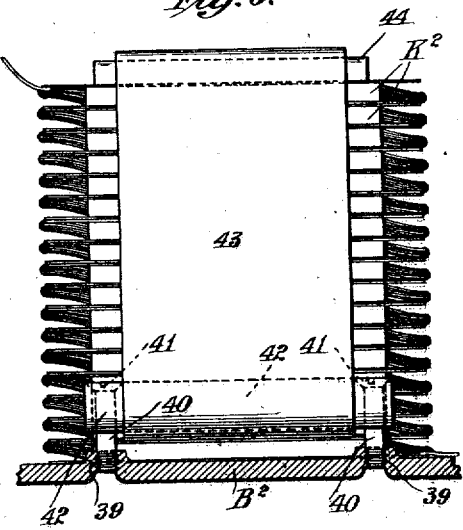
Fig. 6 is a side elevation of the form of Fig. 5.

In Figs. 5 and 6 is disclosed a modification in which the use of a clamping plate described in connection with Figs. 1 and 2 is obviated, the clamping rods being secured directly to the bottom of the casing which constitutes a pressure member. Referring to Figs. 5 and 6 the casing B² is provided with threaded openings 39 upon opposite sides of the stack K² resting thereon. Threaded in these openings are screws 40 having heads 41 at their upper ends. Clamping rods 42 are slidably mounted upon the screws 40 between the heads and the casing and form means for securing the band or loop 43 having the construction shown in Figs. 1 and 2 and as above described.

This band extends over a covex pressure plate 44 on top of the stack K' substantially as shown. With the exception of the means for mounting the clamping rods 42 the construction is the same as in Figs. 1 and 2. Upon the adjustment of screws 40 the band exerts a uniform pressure over the ends of the stack and presses the stack firmly against the bottom of the casing and the elements thereof in intimate contact. The construction of Figs. 5 and 6 may also be treated as above described and surrounded by wax or other filler.

It is to be understood that the invention is not limited to the embodiments and features specifically shown and described herein, but such embodiments and features are subject to change and modifications without any departure from the spirit of the invention.

I claim:

1. In an electrical condenser, a stack comprising sections connected in series and having its ends at a difference of potential, pressure members on the opposite ends of the stack and a flexible binding device of insulating material connecting said members for clamping the elements of the stack together.

2. In a electrical condenser, a stack having its ends at a difference of potential, a clamp compressing said stack and including means insulating the ends from each other, and a metal casing enclosing said stack and clamp, said casing being at the potential of one end of the stack.

3. In an electrical condenser, a stack of sections connected in series and comprising alternate sheets of conductors and dielectric, said stack having its ends at a difference of potential, a clamp compressing said stack to bring said sheets into intimate contact and comprising means insulating said ends from each other, a casing of metal enclosing said stack and clamp and being at the potential of one end of the stack, said clamp functioning independently of said casing, and a filler of insulating material embedding said clamp and stack within the casing.

4. In an electrical condenser, a stack and a clamp compressing said stack and comprising a pressure plate on one end of the stack and an insulating member having lateral portions secured to said plate and arranged along opposite sides of the stack and an intermediate portion extending around the opposite end of the stack.

5. In an electrical condenser, a stack of alternately arranged conductors and dielectric and a clamp compressing said stack and comprising pressure members upon the ends of the stack and a band of flexible insulating material connecting said members to compress the stack.

6. An electrical condenser comprising a stack, a plate engaging one end of the stack, clamping bars adjustably connected to said plate and arranged upon opposite sides of said stack, a pressure member at the other end of said stack and a flexible band of insulating material extending around said pressure member and connected to said bars, whereby the elements of said stack may be maintained in intimate contact.

7. An electrical condenser comprising a casing a condenser stack within said casing and comprising alternately arranged conductors and insulators, a pressure member upon one end of said stack, clamping bars adjustably connected within said casing upon opposite sides of said stack, and a loop of flexible insulating material having closed ends connected to said bars and extending from one of said bars to the other around said pressure member and at opposite sides of said stack, and a filler in said casing in which said stack and clamp are imbedded.

8. In an electrical condenser, a stack comprising sections connected in series, composed of alternate sheets of foil and dielectric and having its ends at a difference of potential, a clamp comprising pressure plates at opposite ends of the stack and including means insulating the opposite ends of the stack from each other, a metal casing in which the clamp and stack rest, said casing constituting one terminal of the stack, said clamp being independent of the casing, an insulating cover for said casing, a terminal connected to the stack and projecting through said cover, and an insulating filler in said casing surrounding said stack and clamp.

9. In an electrical condenser, a stack, pressure plates on opposite ends of the stack, pressure-applying means engaging one pressure plate and a connection of flexible insulating material for transmitting a pressure to the opposite pressure plate from said pressure-applying means, whereby the stack is compressed between said plates.

10. In an electrical condenser, a stack comprising alternate sheets of foil and dielectric, pressure plates upon opposite ends of the stack and means for causing said pressure plates to compress the stack and including several plies of flexible insulating strip.

11. In an electrical condenser, a stack comprising sheets of conductors and dielectrics, pressure plates upon opposite ends of the stack, a flexible connection comprising several plies of insulating strip and having a portion extending around one pressure plate and at opposite sides of the stack and means interposed between the other plate and the connection for exerting a longitudinal stress thereon at opposite sides to clamp said plates against the stack.

12. In an electrical condenser, a stack comprising sections connected in series and composed of alternate sheets of foil and dielectric, pressure plates upon opposite ends of the stack, means for clamping said pressure plates against the stack comprising a flexible strip of insulating material arranged in plies and connecting the plates, a metal casing receiving said stack and clamp, terminal leads from said stack and a filler of insulating material within the casing surrounding the stack.

13. An electrical condenser comprising a stack, a pressure member bearing against one end of the stack, and a clamping member looped over the other end of the stack and having two ends adjustably secured to the pressure member at the first end of the stack, whereby the stack is clamped between the pressure member and the looped end of the clamping member.

14. In an electrical condenser, the combination with the stack, of a metal casing enclosing the stack, a metal pressure member in the metal casing and between the casing and the stack; a yieldable clamping member, and means co-operating with the pressure member to vary the pressure exerted by the yielding clamping member on the stack.

B. MACPHERSON.